United States Patent
Gupta et al.

(10) Patent No.: US 9,218,301 B2
(45) Date of Patent: Dec. 22, 2015

(54) STORAGE DEVICE SECURITY SYSTEM

(71) Applicant: Dell Products L.P., Round Rock, TX (US)

(72) Inventors: Chitrak Gupta, Kolkata (IN); Sushma Basavarajaiah, Tumkur (IN)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 14/061,841

(22) Filed: Oct. 24, 2013

(65) Prior Publication Data

US 2015/0121028 A1    Apr. 30, 2015

(51) Int. Cl.

| G06F 12/14 | (2006.01) |
|---|---|
| G06F 21/60 | (2013.01) |
| H04L 29/06 | (2006.01) |
| G06F 21/62 | (2013.01) |
| H04L 9/08 | (2006.01) |

(52) U.S. Cl.
CPC .......... *G06F 12/1466* (2013.01); *G06F 21/602* (2013.01); *G06F 21/62* (2013.01); *H04L 9/0819* (2013.01); *H04L 63/08* (2013.01)

(58) Field of Classification Search
CPC ....... G06F 21/602; G06F 21/62; H04L 63/08; H04L 9/0819
See application file for complete search history.

(56) References Cited

U.S. PATENT DOCUMENTS

| 2010/0100733 | A1* | 4/2010 | Jaber et al. ................. 713/168 |
| 2010/0111309 | A1* | 5/2010 | Khatri et al. ................ 380/283 |
| 2012/0254602 | A1  | 10/2012 | Bhansali et al. |
| 2013/0007455 | A1* | 1/2013 | Jaber et al. ................. 713/171 |
| 2014/0025947 | A1* | 1/2014 | Jaber et al. ................. 713/164 |
| 2014/0331049 | A1* | 11/2014 | Duby et al. ................. 713/171 |

\* cited by examiner

*Primary Examiner* — Ryan Bertram
(74) *Attorney, Agent, or Firm* — Haynes and Boone, LLP

(57) ABSTRACT

A storage device security system includes a server that is coupled to a storage device, a storage controller, a configuration IHS, and a remote access controller. The remote access controller receives a storage device access key request and a storage controller Globally Unique Identifier (GUID) from the storage controller. The remote access controller also receives a server GUID from the server. The remote access controller also receives a security key from the configuration IHS over a network. The remote access controller is configured to use a remote access controller Media Access Control (MAC) address, the storage controller GUID, the server IHS GUID, and the security key to generate a storage device access key. The remote access controller may then provide the storage device access key to the storage controller, and storage controller may use the storage device access key to access the storage device coupled to the server IHS.

20 Claims, 5 Drawing Sheets

STORAGE DEVICE SECURITY SYSTEM

BACKGROUND

The present disclosure relates generally to information handling systems, and more particularly to a system for providing security for information handling systems storage devices.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs such as, for example, IHSs in data centers, may store a wide variety of sensitive data or information that may be subject to unauthorized access. For example, theft of server IHSs and/or individual storage devices within server IHSs may provide access to the sensitive data or information stored on those storage devices. In other examples, decommissioning of a server IHS or individual storage device within server IHSs may provide also access to the sensitive data or information stored on those storage devices. Conventional authentication and encryption schemes such as two-factor authentication, the Tivoli Key Lifecycle Manager or Trusted Platform Module available from IBM corporation of Armonk, N.Y., and Bitlocker Drive Encryption available from Microsoft corporation of Redmond, Wash., are subject to large costs, configuration and maintenance issues, bind their users to standard procedures of key management, and suffer from a number of other deficiencies known in the art.

Accordingly, it would be desirable to provide an improved storage device security system.

SUMMARY

According to one embodiment, a storage device security system includes a server Information Handling System (IHS) that includes a server IHS identifier and that is coupled to a storage device; a storage controller that includes a storage controller identifier; a configuration IHS that is configured to provide a security key; a remote access controller that includes a remote access controller address and that is coupled to the server IHS, the storage controller, and the configuration IHS, wherein the remote access controller is configured to: receive a storage device access key request from the storage controller; receive the storage controller identifier from the storage controller; receive the server IHS identifier from the server IHS; receive the security key from the configuration IHS; use the remote access controller address, the storage controller identifier, the server IHS identifier, and the security key to generate a storage device access key; and provide the storage device access key to the storage controller, wherein the storage controller is configured to use the storage device access key to access the storage device coupled to the server IHS.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
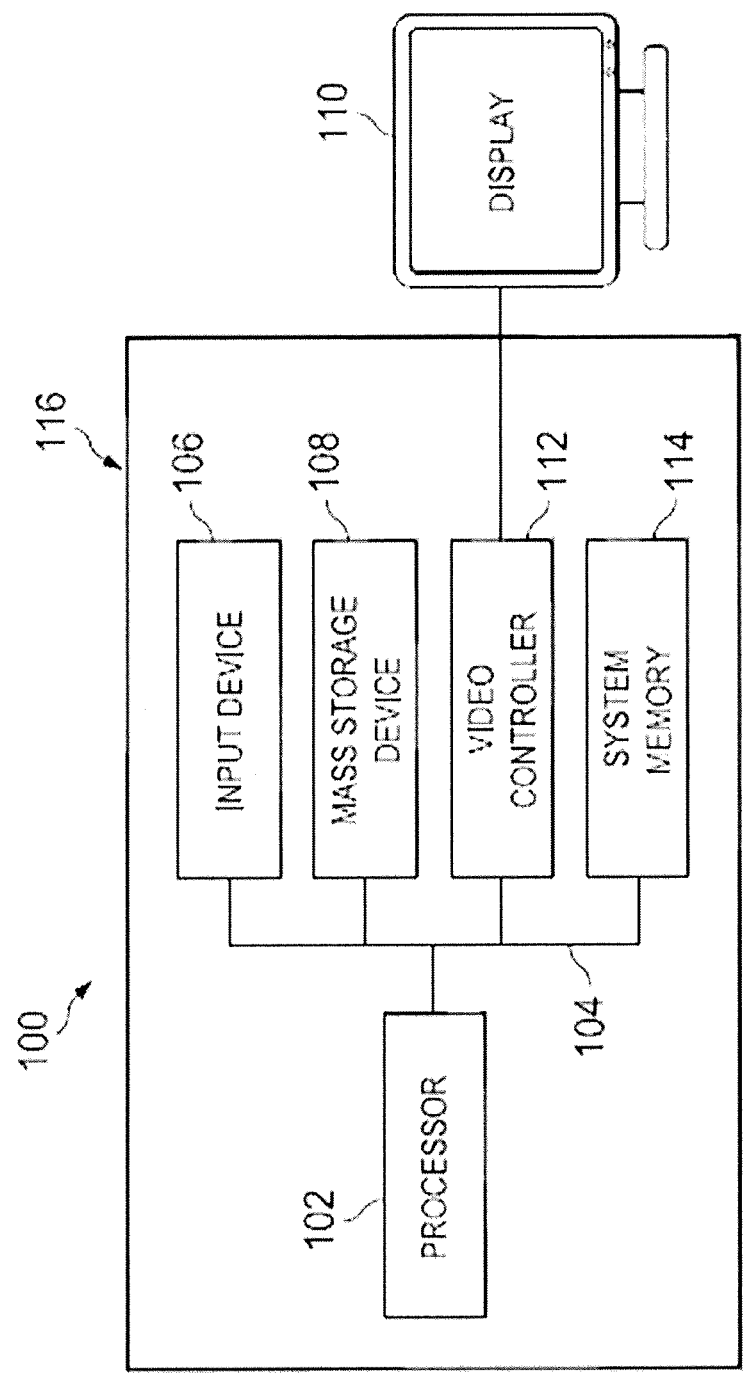
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a storage device security system 200 is illustrated. The storage device security system 200 includes a plurality of storage devices 202a, 202b, 202c, and 202d, although more or fewer storage devices will fall within the scope of the present disclosure. In some embodiments, any or all of the storage devices 202a-d may include hardware-based full disk encryption. For example, any or all of the storage devices 202a-d may be self-encrypting drives (SEDs) that may, for example, include circuitry built into the disk drive controller chip that is configured to encrypt all data written to the storage media and decrypts all the data read from the storage media automatically. In other embodiments, any or all of the storage devices 202a-d may not include hardware-based full disk encryption. However, whether hardware-based full disk encryption is provided in the storage devices 202a-d, each of the storage devices 202a-d may be configured to provide for the locking and unlocking of read operations and write operations to the storage media in the storage devices 202a-d, discussed in further detail below. In some embodiments, one or more of the storage devices 202a-d may be part of a redundant array of independent disks (RAID) storage system. For example, the storage devices 202a-d may provide the RAID storage system.

Each of the storage devices is coupled to a storage controller 204. In an embodiment, the storage controller 204 may be a RAID controller such as, for example, the PowerEdge RAID controller (PERC) available from Dell, Inc. of Round Rock, Tex. The storage controller 204 may be associated with a variety of storage controller information including a storage controller identifier such as a storage controller globally unique identifier (GUID) and/or a variety of other storage controller information known in the art that is unique to the storage controller 204 such that it may identify that storage controller relative to, for example, other storage controllers. The storage controller 204 may include one or more processors and a non-transitory memory that includes instruction that, when executed by the one or more processors, cause the one or more processors to provide a storage controller engine that enhances performance of storage systems, increases the reliability of storage systems, simplifies the management of storage systems, and/or provides any of the other functionality of the storage controller 204 discussed below.

The storage controller 204 is coupled to a remote access controller 206. In the illustrated embodiment, the storage controller 204 coupling to the remote access controller 206 includes a direct communication connection (e.g., with no intermediate computing devices or systems used to conduct communications between the storage controller 204 and the remote access controller 206) over which the storage controller 204 and the remote access controller 206 may communicate using, for example, the management component transport protocol (MCTP). However, as discussed below with reference to FIG. 2b, in other embodiments the communication connection between the storage controller 204 and the remote access controller may not be direct. In an embodiment, the remote access controller 206 may be a Dell Remote Access Controller (DRAC) such as, for example, the DRAC or iDRAC available from Dell, Inc. of Round Rock, Tex. The remote access controller 206 may be associated with a variety of remote access controller information including a remote access controller media access control (MAC) address and/or a variety of other remote access controller information known in the art that is unique to the remote access controller 206 such that it may identify that remote access controller relative to, for example, other remote access controllers. The remote access controller 206 may include one or more processors and a non-transitory memory that includes instruction that, when executed by the one or more processors, cause the one or more processors to provide a remote access controller engine that provides out-of-band management functionality such as power management, virtual media access, remote console capabilities, and/or provides any of the other functionality of the remote access controller 206 discussed below.

Figure 2A:
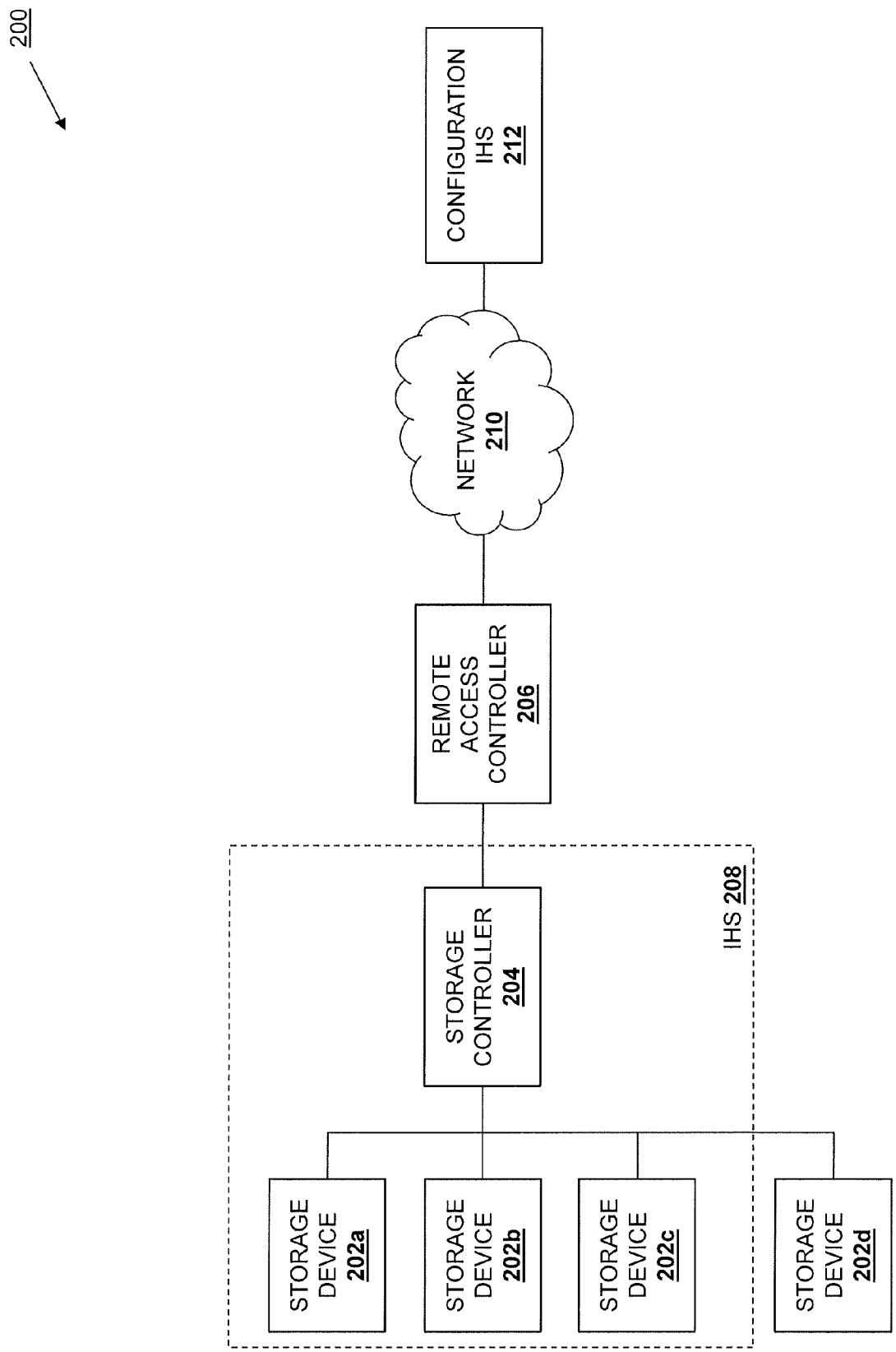
FIG. 2*a* is a schematic view illustrating an embodiment of a storage device security system.

In the embodiment illustrated in FIG. 2a, the storage devices 202a-c and the storage controller 204 are housed in an IHS 208. In addition, the storage device 202d is coupled to the IHS 208 through a coupling such as, for example, a serial attached small computer system interface (SAS) cable. In some embodiments, the IHS 208 may be the IHS 100, discussed above with reference to FIG. 1, and/or may include some or all of the components of the IHS 100. Thus, each of the storage devices 202a-c and the storage controller 204 may be housed in the chassis (e.g., the chassis 116 discussed above with reference to FIG. 1) of the IHS 208, while the storage device 202d may be connected to a connector on the chassis of the IHS 208. In an embodiment, the IHS 208 is a server IHS such as, for example, a storage server IHS including a RAID storage system (e.g., the storage devices 202a, 202b, 202c, and/or 202d) and a RAID controller (e.g., the storage controller 204). The IHS 208 may be associated with a variety of IHS information including an IHS identifier such as a server GUID, a server local area network (LAN) on motherboard (LOM) address, a server service tag, a server asset tag, a server model number and/or a variety of other IHS information known in the art. While not illustrated in FIG. 2a, one of skill in the art will recognize that the IHS 208 may include a variety of other IHS components that have been omitted for clarity of discussion and illustration.

The remote access controller 206 is connected to the storage controller 204 (e.g., through a connection between the IHS 208 and the remote access controller 206) and to a network 210 that is connected to a configuration IHS 212. In an embodiment, the network 204 may be a local area network (LAN), a data center network, a wide area network, and/or a variety of other networks known in the art. In an embodiment, the configuration IHS 212 is a dynamic host configuration protocol (DHCP) server IHS is configured to use DHCP to configure devices that are connected to the network 210 so that those devices can communicate on that network using an appropriate protocol (e.g., the Internet Protocol (IP)). The configuration IHS 212 may include one or more processors and a non-transitory memory that includes instruction that, when executed by the one or more processors, cause the one or more processors to provide a configuration IHS engine that maintains a database of available IP addresses and configuration information, receives requests from client devices, determine the network to which the client devices are connected, allocates IP addresses or prefixes that are appropriate for the client devices, sends configuration information to the client devices, and/or provides any of the other functionality of the configuration IHS 212 discussed below.

While the embodiment of the storage device security system 200 illustrated in FIG. 2a provides a specific configuration that includes the storage devices 202a-c and the storage controller 204 located in the IHS 208, the storage device 202d external to and connected with the IHS 208, the remote access controller 206 external to and connected to the IHS 208, and the configuration IHS 212 connected to the remote access controller 206 through the network 210, a wide variety of modification to the storage device security system 200 is envisioned as falling within the scope of the present disclosure. For example, the storage device security system 200 may include multiple storage controllers (e.g., multiple RAID controllers) that are substantially similar to the storage controller 204, and that are each coupled to one or more storage devices that are substantially similar to the storage devices 202a-d. In another example, rather than located in the IHS 208, the storage devices 202a-d and the storage controller 204 may be dispersed across multiple IHSs. While a few alternative examples have been provided, one of skill in the art in possession of the present disclosure will recognize that any configuration of storage devices, storage controllers, remote access controllers, and configuration IHSs that operate as described below will fall within the scope of the present disclosure.

Figure 2B:
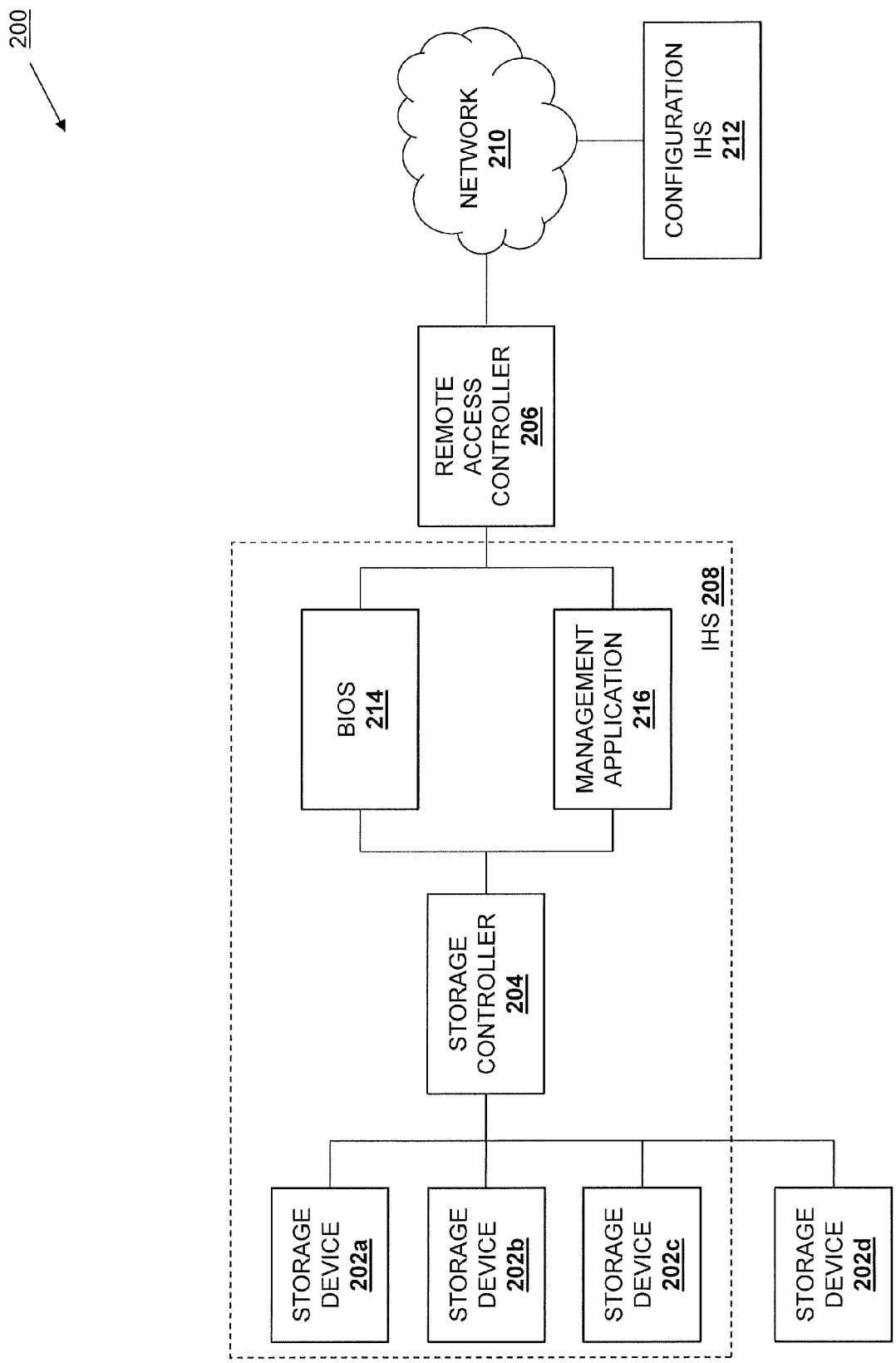
FIG. 2*b* is a schematic view illustrating an embodiment of a storage device security system.

Referring now to FIG. 2b, the storage device security system 200 is illustrated with a modification from the system illustrated in FIG. 2a that provides for communication between the storage controller 204 and the remote access controller 206 when a direction communication connection is not available. As can be seen in FIG. 2b, a basic input/output system (BIOS) 214 is provided between the storage controller 204 and the remote access controller 206. As discussed in further detail below, the BIOS 214 may provide for communication between the storage controller 204 and the remote access controller 206 when the IHS 208 is booted, started up, or otherwise being initiated. Furthermore, a management application 216 such as, for example, a storage management application running on an operating system, is also provided between the storage controller 204 and the remote access controller 206. As discussed in further detail below, the management application 216 may provide for communication between the storage controller 204 and the remote access controller 206 when the IHS 208 is running, operating, or has otherwise already been initiated and is controlled by the operating system.

Figure 3:
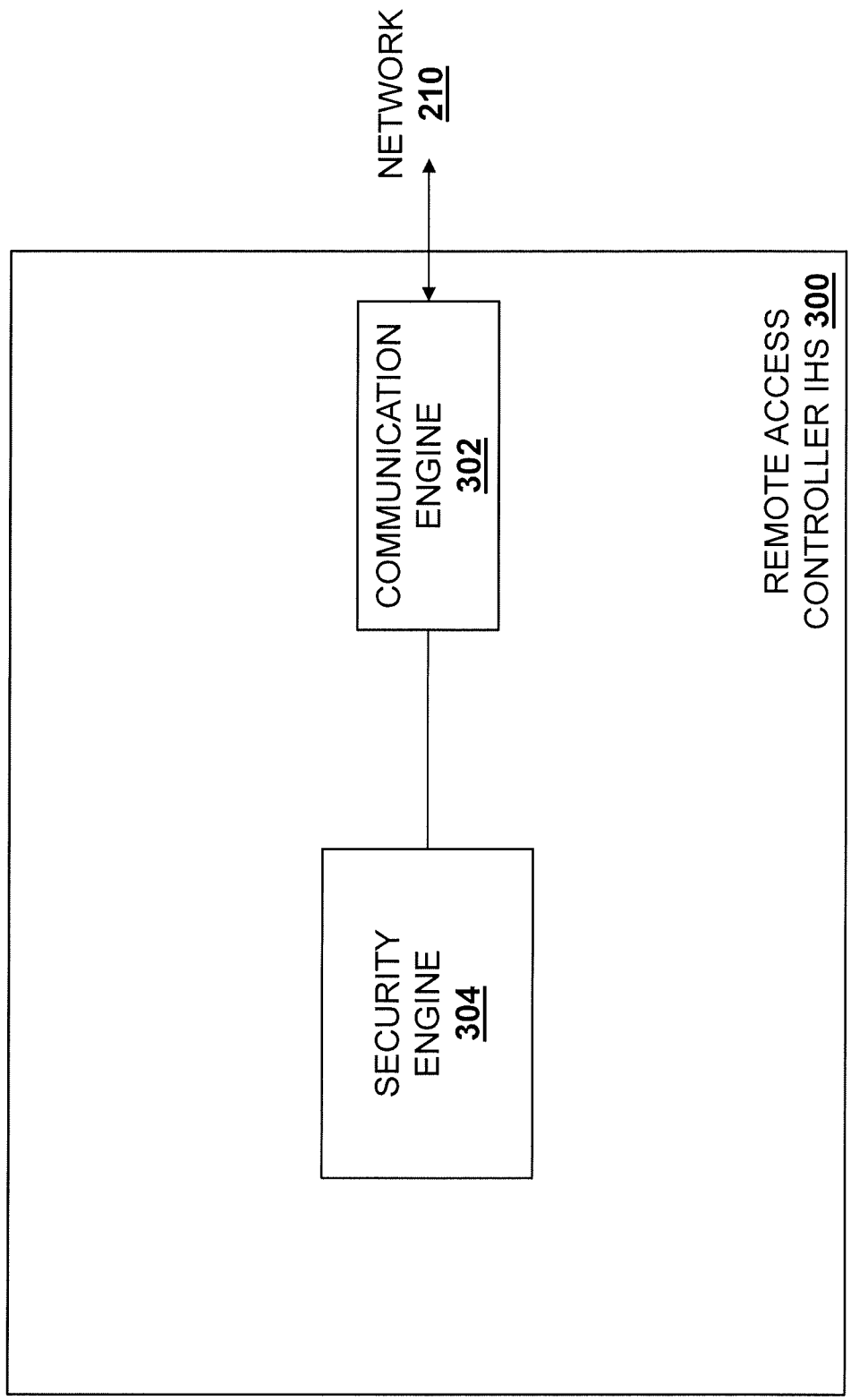
FIG. 3 is a schematic view illustrating an embodiment of a remote access controller information handling system.

Referring now to FIG. 3, an embodiment of a remote access controller IHS 300 is illustrated. In an embodiment, the remote access controller IHS 300 may be the remote access controller 206 discussed above with reference to FIGS. 2a and 2b, and/or may include some or all of the components of the IHS 100 discussed above with reference to FIG. 1. In an embodiment, the remote access controller IHS 300 may house one or more processors and a non-transitory memory that includes instruction that, when executed by the one or more processors, cause the one or more processors to provide a communication engine 302 and the security engine 304. In an embodiment, the communication engine 302 is coupled to a network 210 (e.g., through a connection between a network communication device in the remote access controller IHS 300, the one or more processors, and the network 210) and to the security engine 304, and is configured to transmit communications between the security engine 304 and the network 210. In an embodiment, the security engine 304 is configured to perform the functions of the security engine, discussed in further detail below.

Figure 4:
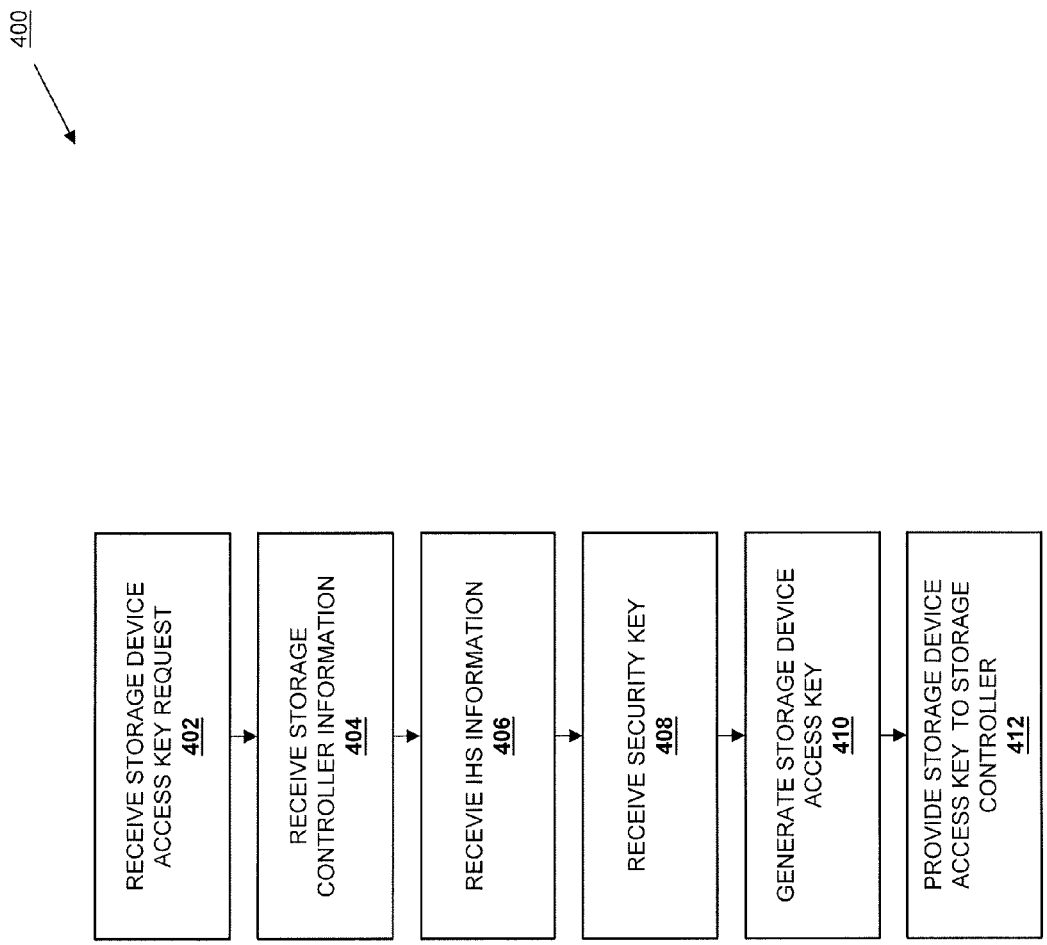
FIG. 4 is a flow chart illustrating an embodiment of a method for securing a storage device.

Referring now to FIG. 4, an embodiment of a method 400 for securing a storage device is illustrated. The method 400 provides security for storage devices by rendering those storage devices inaccessible in the event that the storage devices or the server IHS in which they are located are removed from their intended network and connected to a different network. In the embodiment discussed below, the method 400 is performed by the security engine 306 provided by the remote access controller 206, but one of skill in the art will recognize that the security engine may be provided in other locations in the storage device security system 200 while remaining within the scope of the present disclosure. The method 400 begins at block 402 where a storage device access key request is received. In an embodiment, the IHS 208 is connected to the remote access controller 206 and started up, booted, or otherwise initiated. For example, the storage device security system 200 may be provided in a data center, and the IHS 208 may be server IHS that is being added to that data center. In response to the initiation of the IHS 208, the storage controller 204 will determine whether storage device security is enabled on the IHS 208. In one example, one or more of the security devices 202a-d may have storage device security enabled through an enablement of a storage device access control function on the storage device. In another example, the IHS 208 may have security enabled on a security system that controls access to the storage devices 202a-d. While a few examples have been provided, storage device security may be enabled on the IHS 208 and/or its storage devices 202a-d in a wide variety of manners while remaining within the scope of the present disclosure.

When storage device security is determined to be enabled on the IHS 208 at block 402, the storage controller 204 sends a storage device access key request that is received by security engine 304 (e.g., through the communication engine 302) in the remote access controller 206/300. Referring to FIG. 2a, in one embodiment the storage controller 204 may communicate the storage device access key request to the remote access controller 206 directly using MCTP or other communication protocols known in the art. Referring to FIG. 2b, in another embodiment the storage controller 204 may communicate the storage device access key request to the BIOS 214, and the BIOS 214 may then communicate that storage device access key request to the remote access controller 206 using an intelligent platform management interface (IPMI) call or other communication technique known in the art. As discussed below, the storage device access key request is a request to the remote access controller 206 to generate and provide the storage controller 204 a storage device security key that may be used to control access to the storage devices 202a-d.

The method 400 then proceeds to block 404 where storage controller information is received. In an embodiment of block 404, the storage controller 204 sends storage controller information that is received by security engine 304 (e.g., through the communication engine 302) in the remote access controller 206/300. While block 404 of the method 400 is illustrated as occurring after block 402, block 404 may be performed before or at the same time as block 402 (e.g., both the storage device access key request and the storage controller information may be communicated from the storage controller 204 to the remote access controller 206 in the same communication or at substantially the same time). Thus, referring to FIG. 2a, the storage controller 204 may communicate the storage controller information to the remote access controller 206 directly using MCTP or other communication protocols known in the art. Similarly, referring to FIG. 2b, the storage controller 204 may communicate the storage controller information to the BIOS 214, and the BIOS 214 may then communicate that storage controller information to the remote access controller 206 using an IPMI call or other communication technique known in the art. As discussed above, the storage controller information may include a storage controller identifier such as a storage controller GUID and/or a variety of other storage controller information know in the art.

The method 100 then proceeds to block 406 where IHS information is received. In an embodiment of block 406, the IHS 208 sends IHS information that is received by security engine 304 (e.g., through the communication engine 302) in the remote access controller 206/300. While block 406 of the method 400 is illustrated as occurring after blocks 402 and 404, block 406 may be performed before or at the same time as blocks 402 and 404. However, in this embodiment, the IHS information is retrieved by the remote access controller 206 following the receipt of the storage device access key request from the storage controller 204. Thus, referring to FIG. 2a or 2b, the IHS 208 may communicate the IHS information to the remote access controller 206 using the BIOS 214 via an IPMI call or other communication technique known in the art. As discussed above, the IHS information may include an IHS identifier such as a server GUID and/o r a variety of other storage controller information know in the art.

The method 100 then proceeds to block 408 where a security key is received. In an embodiment of block 408, the configuration IHS sends a security key over the network 210 that is received by security engine 304 (e.g., through the communication engine 302) in the remote access controller 206/300. While block 408 of the method 400 is illustrated as occurring after blocks 402, 404, and 406, block 408 may be performed before or at the same time as blocks 402, 404, and 406. In this embodiment, the security key is retrieved by the remote access controller 206 prior to the receipt of the storage device access key request (e.g., the configuration IHS 212 may send the security key over the network to the remote access controller 206 when the remote access controller 206 is connected to the network 210 and prior to the connection of the IHS 208 to the remote access controller 206). As discussed above, the configuration IHS 212 may be a DHCP server IHS. In those embodiments, the DHCP server IHS may be configured to provide configuration parameters such as, for example, original equipment manufacturer (OEM) defined configuration parameters, and those configuration parameters may include the security key provided by the configuration IHS 212 and received by the remote access controller 206 at block 408. In an embodiment, the security key may be a DHCP key token, a system security token, a symmetric key, combinations thereof, and/or a variety of other information known in the art that may be used to provide the security key having the functionality discussed below.

The method 400 then proceeds to block 410 where a storage device access key is generated. As discussed above, the remote access controller 206 may be associated with a variety of remote access controller information including a remote access controller media access control (MAC) address and/or a variety of other remote access controller information know in the art In an embodiment of block 410, the security engine 304 in the remote access controller 206/300 uses the remote access controller information, the storage controller information received at block 404, the IHS information received at block 406, and the security key received at block 408 to generate a storage device access key. For example, the security engine 304 may use a remote access controller MAC address, a storage controller GUID, an IHS GUID, and the security key to generate the storage device access key, In a specific example of block 410, the security engine 304 performs a hashing operation on the remote access controller information, the storage controller information, and the IHS information to create a key template (e.g., a key template file), and then encrypts that key template using the security key. As is known in the art, hashing operations may be performed using hash functions that are algorithms that map data of variable lengths to data of a fixed length. However, while a specific example including the hashing of the remote access controller information, the storage controller information, and the IHS information followed by the encrypting of the hash result using the security key has been described, one of skill in the art in possession of the present disclosure will recognize that the remote access controller information, the storage controller information, the IHS information, and the security key may be used in a wide variety of manners to create a storage device access key that will fall within the scope of the present disclosure. Thus, in the embodiment where the IHS 208 is a server IHS in a datacenter, the storage device access key generated at block 410 is unique to the IHS 208 (i.e., based on the server GUID used to generate the storage device access key) and tied to the data center (e.g., based on the security key provided by the DHCP server IHS and used to generate the storage device access key).

The method 400 then proceeds to block 412 where the storage device access key is provided to the storage controller. In an embodiment of block 412, the security engine 304 in the remote access controller 206/300 provides the storage device access key generated at block 410 to the storage controller 204. Referring to FIG. 2a, the security engine 304 may communicate the storage device access key to the storage controller 204 directly using MCTP or other communication protocols known in the art. Referring to FIG. 2b, the remote access controller 206 may communicate the storage device access key to the BIOS 214, and the BIOS 214 may then communicate that storage device access key to the storage controller 204 using communication technique known in the art (e.g., proprietary communication systems provided by storage controller vendors). While a single storage controller 204 has been illustrated, in other embodiment, blocks 402-412 of the method 400 may be performed by any number of storage controllers, and one of skill in the art in possession of the present disclosure will recognize that the method 400 will then result in a different storage device access key being generated for each of those storage controllers (e.g., each based on the different storage controller information used to generate the storage device access keys). For example, each storage controller that requests a storage device access key from the remote access controller will send different storage controller information (e.g. different storage controller GUIDs) to the remote access controller 206, and will cause the remote access controller to generate a different drive access key based, at least in part, on each of those different storage controller GUI Ds.

In another embodiment, the method 400 may be performed in response to the addition of a storage device to the IHS 208 when the IHS 208 is powered, up, or otherwise running an operating system and already connected to the remote access controller 206. In such situations, the method 400 is performed in substantially the same manner as discussed above, but with the following provisions. At block 402, the storage device access key request may be sent in response to detecting the storage device being added to the IHS 208. Furthermore the storage device access key request may be sent directly to the remote access controller as discussed above with reference to FIG. 2a, or may be sent to the management application 216 running on the operating system such that it is forwarded to the remote access controller 206. In addition, at block 412, the storage device access key may be provided directly to the storage controller 204 as discussed above with reference to FIG. 2a, or sent to the management application 216 running on the operating system such that the management application 216 forwards it to the storage controller 204.

Once the storage device access key is provided to the storage controller 204 at block 412 of the method 400, the storage device security system may operate in a variety of manners, a few examples of which are detailed below. Following block 412, the storage controller 204 stores the storage device access key received at block 412 in a database on a non-transitory memory, and provides the storage device access key to the storage device(s) (e.g., the storage devices 202a-d) that it will be used to access. In an embodiment, the storage device access key may be stored in the non-volatile random access memory (NVRAM) and/or other locations in its associated storage devices. The storage controller 204 may then use that storage device access key to access any of the storage devices 202*a-d* included in or connected to the IHS 208. As discussed above, each of the storage devices 202*a-d* may be configured to provide for the locking and unlocking of read operations and write operations to the storage media in the storage devices 202*a-d*, and the storage controller 204 may use the storage device access key to unlock the read operations and write operations to the storage media in the storage devices 202*a-d* in order to performs reads and writes to the storage devices 202*a-d*. However, the storage device access key may be used to provide for a variety of accessing functions to the storage devices 202*a-d* other than reading and writing while remaining within the scope of the present disclosure.

After the storage device access key is generated and provided to the storage controller 204, the storage controller 204 may not require the generation of new storage device access keys. However, the storage controller 204 may send the storage device access key to the remote access controller 206 for verification. In such a situation, the remote access controller 206 will receive the storage device access key and attempt to decrypt the storage device access key using the security key (received from the configuration IHS 212 at block 408). If that decryption is successful, the remote access controller 206 sends a validation or endorsement of that storage device access key to the storage controller 204, and the storage controller 204 will then use that storage device access key to access the storage devices 202*a-d*. Thus, in embodiments where the IHS 208 is a server IHS in a datacenter, if the server IHS is removed from the data center and connected to a different datacenter, the storage device access key stored by the storage controller 204 will not be validated or endorsed, because the security key will not be available to decrypt that storage device access key. Furthermore, if a storage device (e.g., any of the storage devices 202*a-d*) are removed or disconnected from the IHS 208, that storage device will be inaccessible without the storage device access key (which is stored in the storage controller) to access that storage device (e.g., unlock it for read and write operations.)

In some situations, new storage device access keys may be generated in the storage device security system of the present disclosure. For example, such "rekeying" may be a result of the moving of a storage device between different server IHSs in a datacenter, the replacement of a storage controller, and/or in a variety of other scenarios known in the art. In the example in which a storage device is moved from a first server IHS in a datacenter to a second IHS in the datacenter (e.g., movement of the storage device 202*a* from the IHS 208 to a different IHS in the datacenter that is connected to the network 210 and the configuration server 212), the remote access controller connected to the second IHS will be able to use the security key received from the configuration IHS 212 to decrypt the storage device access key in the storage device that is now connected to the second IHS (e.g., because the storage device access key in that storage device was encrypted by the security key provided by the configuration IHS 212). However, upon decryption of that storage device access key, the key template (e.g., the key template file) that is accessible after the decryption will not have been created for the remote access controller and its connected second IHS (because that key template was created for the different remote access controller connected to the first IHS). In response to detecting the incorrect key template, the remote access controller connected to the second IHS may cause the second IHS to confirm with the administrator of the storage device security system (or some other user of the second IHS) that they would like to rekey the second IHS and its storage device(s) and, in response, perform the method 400 to obtain a new storage device access key for the storage device in the second IHS.

In the example in which a first storage controller in a datacenter is replaced with a second storage controller (e.g., replacement of the storage controller 204 with a different storage controller), the second storage controller will read the storage device access key from the storage device(s) (e.g., from the NVRAM in the storage device(s)), and send that storage device access key along with its storage controller information (e.g., its storage controller GUID) and a rekey request to the remote access controller 206. The remote access controller may then change the key template (e.g., using the storage controller information from the second storage controller), generate a new storage device access key, and provide that new storage device access key to the second storage controller. The storage device security system may operate to distinguish between authentic rekey requests and rouge rekey requests. For example, the rekey request may be required to come from the storage controller 204, and in response to receiving the rekey request, the remote access controller 206 may generate the key template and then determine if that key template matches stored key templates and, if so, the rekey request will be executed. In an embodiment, a limited number of new storage device access keys may be generated in the storage device security system 200. For example, the configuration IHS 212 may be configured to provide a limited number of security keys that are mapped to a rekey counter, which is set in the storage controller 204 and has its value sent to the remote access controller 206. The remote access controller may then receive a map of the key templates (e.g., the hashed remote access controller information, storage controller information, and IHS information) and the rekey counter and use the security key associated with the value of the rekey counter. In an embodiment, in the event of a forced rekey, the storage devices 202*a-d* may be erased.

In some situations, the storage device security system of the present disclosure may operate to deal with failures in one or more of its components. For example, failures of the configuration IHS 212, the remote access controller 206, and/or the storage controller 204 may be dealt with by the storage device security system to ensure that the operation and security of the storage devices 202*a-d* is maintained. For example, the failure of the configuration IHS 212 may be handled by including a backup/failover/redundant configuration IHS in the storage device security system 200 that includes the same configuration files as the configuration IHS 212 (e.g., by backing up the DHCP configuration file on the backup/failover/redundant configuration IHS). In the event of a failure of the configuration IHS 212, the backup/failover/redundant configuration IHS may operate substantially similarly to the configuration IHS 212 described above.

In the example where the remote access controller 206 fails, the new remote access controller 206 will be configured to generate a new storage device access key using the information discussed above, but with its own remote access controller information. In addition, the replacement of the remote access controller 206 will typically include the replacement of a motherboard that includes the remote access controller 206. In such a situation, a motherboard identifier such as, for example, a Service Tag of the motherboard, may be replicated on the motherboard of the new remote access controller that is replacing the remote access controller 206. In addition, other remote access controller configuration parameters for the new remote access controller may be cloned through, for example, extensible markup language (XML) based configuration. In the example where the storage controller 204 fails, the new storage controller will retrieve a new storage device access key in substantially the same manner as described above for the replacement of a storage controller and rekeying of the storage device security system.

Thus, a storage device security system and method has been described that provides for storage device security by generating a network context-aware key that is used to access the storage devices, and operates to prevent access to those storage devices if they are moved out of an intended network. In one embodiment, a DHCP server operates to provide a network symmetric key token, through an OEM defined configuration parameter, that is used to generate a storage device access key for at least one storage device in the system. Such embodiments result in no extra cost to users that have DHCP configuration in their datacenters, as the configuration template used to provide the key token is easily obtained by the storage device security system provider. The storage device security system requires no key database management, as the key management and authorization to provide access to the storage devices is performed during run-time. In some embodiments, the entire key management system may be contained within a server IHS and its service processor, and no new communication protocols are necessary. The present disclosure provides a system for securing storage devices that shifts from providing keys in the centralized location to run-time access provisioning with a network hash token that is obtained from a data center context provisioning engine. Furthermore, while the present disclosure has focused on the securing storage devices, one of skill in the art in possession of the present disclosure will recognize that other devices, either by themselves or included in a server, may be secured substantially similarly as described above for the storage devices using the techniques described herein.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device security system, comprising:
   a server Information Handling System (IHS) that includes a server IHS identifier and that is coupled to a storage device;
   a storage controller that includes a storage controller identifier;
   a configuration IHS that is configured to provide a security key;
   a remote access controller that includes a remote access controller address and that is coupled to the server IHS, the storage controller, and the configuration IHS, wherein the remote access controller is configured to:
      receive a storage device access key request from the storage controller;
      receive the storage controller identifier from the storage controller;
      receive the server IHS identifier from the server IHS;
      receive the security key from the configuration IHS;
      use the remote access controller address, the storage controller identifier, the server IHS identifier, and the security key to generate a storage device access key; and
      provide the storage device access key to the storage controller, wherein the storage controller is configured to use the storage device access key to access the storage device coupled to the server IHS.

2. The storage device security system of claim 1, wherein the server IHS identifier includes a server Globally Unique Identifier (GUID), the storage controller identifier includes a storage controller GUID, and the remote access controller address includes a remote access controller Media Access Control (MAC) address.

3. The storage device security system of claim 1, wherein the configuration IHS is a Dynamic Host Configuration Protocol (DHCP) IHS that is coupled to the remote access controller through a network.

4. The storage device security system of claim 1, wherein the remote access controller is configured to receive the storage device access key request directly from the storage controller.

5. The storage device security system of claim 1, wherein the remote access controller is configured to receive the storage device access key request from the storage controller through at least one of a Basic Input/Output System (BIOS) on the server IHS and a management application running on an operating system on the server IHS.

6. The storage device security system of claim 1, wherein the using the remote access controller address, the storage controller identifier, the server IHS identifier, and the security key to generate a storage device access key includes:
   performing a hashing operation using the remote access controller address, the storage controller identifier, and the server IHS identifier to generate a key template; and
   encrypting the key template using the security key to generate the storage device access key.

7. The storage device security system of claim 1, wherein the storage controller is configured to use the storage device access key to access the storage device coupled to the server IHS by using the storage device access key to read and write to the storage device coupled to the server IHS.

8. An information handling system (IHS), comprising:
   at least one processor;
   at least one non-transitory memory that is coupled to the at least one processor and that includes instructions that, when executed by the at least one processor, cause the at least one processor to provide a security engine that is configured to:
      receive a storage device access key request and storage controller information from a storage controller;
      receive IHS information;
      receive a security key from a configuration IHS;
      use remote access controller information, the storage controller information, the IHS information, and the security key to generate a storage device access key; and
      provide the storage device access key to the storage controller, wherein the storage device access key is configured to provide the storage controller access to a storage device.

9. The IHS of claim 8, wherein the IHS information includes a server Globally Unique Identifier (GUID), the storage controller information includes a storage controller GUID, and the remote access controller information includes a remote access controller Media Access Control (MAC) address.

10. The IHS of claim 8, wherein the configuration IHS is a Dynamic Host Configuration Protocol (DHCP) IHS that is coupled to the security engine through a network.

11. The IHS of claim 8, wherein the security engine is configured to receive the storage device access key request directly from the storage controller.

12. The IHS of claim 8, wherein the security engine is configured to receive the storage device access key request from the storage controller through at least one of a Basic Input/Output System (BIOS) and a management application running on an operating system.

13. The IHS of claim 8, wherein the using the remote access controller information, the storage controller information, the IHS information, and the security key to generate a storage device access key includes:
performing a hashing operation using the remote access controller information, the storage controller information, and the IHS information to generate a key template; and
encrypting the key template using the security key to generate the storage device access key.

14. The IHS of claim 8, wherein the storage device access key is configured to provide the storage controller access to a storage device by allowing the storage controller to read and write to the storage device.

15. A method for securing a storage device, comprising:
receiving a storage device access key request and storage controller information from a storage controller;
receiving IHS information;
receiving a security key from a configuration IHS;
using remote access controller information, the storage controller information, the IHS information, and the security key to generate a storage device access key; and
providing the storage device access key to the storage controller, wherein the storage device access key is configured to allow the storage controller to access to a storage device.

16. The method of claim 15, wherein the IHS information includes a server Globally Unique Identifier (GUID), the storage controller information includes a storage controller GUID, and the remote access controller information includes a remote access controller Media Access Control (MAC) address.

17. The method of claim 15, wherein the security engine is configured to receive the storage device access key request directly from the storage controller.

18. The method of claim 15, wherein the security engine is configured to receive the storage device access key request from the storage controller through at least one of a Basic Input/Output System (BIOS) and a management application running on an operating system.

19. The method of claim 15, wherein the using the remote access controller information, the storage controller information, the IHS information, and the security key to generate a storage device access key includes:
performing a hashing operation using the remote access controller information, the storage controller information, and the IHS information to generate a key template; and
encrypting the key template using the security key to generate the storage device access key.

20. The method of claim 15, wherein the storage device access key is configured to provide the storage controller access to a storage device by allowing the storage controller to read and write to the storage device.

\* \* \* \* \*